Sept. 3, 1963    G. L. HARTFIELD ETAL    3,102,394
CONTROLLED RELIEF SYSTEM
Filed Jan. 24, 1958    2 Sheets-Sheet 1

Sept. 3, 1963 G. L. HARTFIELD ETAL 3,102,394
CONTROLLED RELIEF SYSTEM
Filed Jan. 24, 1958 2 Sheets-Sheet 2

WITNESSES
John E. Heasley, Jr.
James F. Young

INVENTORS
Grady L. Hartfield &
Henry A. VanWassen
BY
Donald J. Smith
ATTORNEY 3,102,394
CONTROLLED RELIEF SYSTEM
Grady L. Hartfield and Henry A. Van Wassen, Pittsburgh,
Pa., assignors to Westinghouse Electric Corporation,
East Pittsburgh, Pa., a corporation of Pennsylvania
Filed Jan. 24, 1958, Ser. No. 710,890
12 Claims. (Cl. 60—107)

The present invention is applicable to steam producing and utilizing plants and more particularly to the secondary or steam producing system of a nuclear reactor plant.

In a nuclear reactor a neutronic chain reaction is sustained in a quantity of fissile material including one or more fissionable isotopes such as $U^{235}$, $U^{233}$ or $Pu^{239}$. In those cases where the chain reaction is propagated by means of slow neutrons, a neutron-slowing material known as a moderator is interspersed in a known manner in the quantity of fissionable isotope. If employed in solid form the fissionable and moderator materials are provided in such configuration to afford flow passages in order to admit a suitable coolant for purposes of removing heat developed by the chain reaction. Frequently, the coolant material is selected from a class of materials, for example light and heavy water, which serve also as efficient moderators; and use of the aforementioned solid moderator material is obviated. When water is employed as a coolant in a neutronic reactor from which useful power is to be extracted, the water is maintained at elevated pressures in order to maintain the boiling point thereof above the reactor operating temperatures.

In the latter type of nuclear reactor, usually referred to as a pressurized water power reactor, the circulating cooling water is maintained within a primary reactor system which is coupled to a secondary cooling or steam producing system through one or more heat exchangers. The steam produced in the heat exchangers is conveyed, for example, to suitable thermodynamic machinery for converting the steam into electric power. The primary reactor system usually is maintained at pressures in the neighborhood of 2,000 pounds per square inch. Specific details regarding the operational and theoretical aspects of nuclear reactors are set forth in Patent 2,708,656 to E. Fermi et al., issued May 17, 1955 and in the Geneva Papers, "Description of the Pressurized Water Reactor Power Plant" at Shippingport, Pa. (A/CONF.8/P/815).

In order to protect the primary reactor system including the reactor vessel and auxiliary equipment associated with the primary system, a number of safety valves are coupled in the primary system. These valves prevent the development of pressures in excess of the design limitations of the system. However, it is anticipated that sudden large reductions in load demand of the electrical output will be reflected back into the primary system where severe pressure surges can be caused. These pressure surges are due to temperature increases resulting in the primary system from the sudden reduction in heat extracted from steam developed in the secondary system. These pressure surges will operate one or more of the primary safety valves which, of course, increases wear on these valves, and more importantly reduces their reliability as a result. Additionally, the primary coolant may be radioactive, and therefore it is highly desirable to minimize operation of the primary safety valves to avoid problems associated with storage and disposal of the radioactive primary coolant discharged by the safety valves.

In view of the foregoing it is desirable to employ relief valves in the secondary or steam system which will obviate operation of the safety valves normally provided in the primary reactor system. These secondary relief valves are controlled such that the pressure surges attended with sudden load losses either are compensated in the secondary reactor system or are transferred back to the primary system in a series of smaller surges which are not sufficiently large to cause operation of the primary safety valves.

Accordingly, an object of the present invention is to provide a novel and efficient controlled relief valve system.

Another object of the invention is to provide a system of the character described adapted for use with the secondary coolant or steam-producing system associated with a nuclear reactor.

A further object of the invention is to provide a controlled relief system adapted for use with a steam producing system and having means associated therewith for relating the relief provided by the relief system to the magnitude of the changes in steam demand.

Still another object of the invention is to provide a controlled steam relief system for use with a thermodynamic electrical generating arrangement, which relief system is activated by a given rate of change of decrease in electrical load.

A still further object of the invention is to provide a controlled steam relief system adapted for a thermodynamic cycle and having means associated therewith for eliminating steam from the system in response to a given rate of decrease in steam demand.

Yet another object of the invention is to provide a controlled steam relief system adapted for the aforesaid thermodynamic arrangement and having means for eliminating a quantity of steam which is proportional to the rate of load decrease in excess of a predetermined rate.

These and other objects, features and advantages of the invention will be made apparent during the forthcoming description of the illustrative embodiments thereof with the description being taken in conjunction with the accompanying drawings, wherein.

In accordance with the invention, the pressure and temperature surges or positive system transients associated with load decreases in a nuclear power plant or other thermodynamic electrical generating arrangement are compensated when exceeding a predetermined amount by ejecting steam from the system. Means are arranged pursuant to the invention for ejecting the steam only when the rate of change in the decreasing load exceeds a predetermined amount. In this arrangement the aforesaid amount is slightly less than that which would operate the primary safety valves usually provided in systems of this nature. Means are also associated with the controlled relief system for increasing the flow of feed water or for adding make-up water to the steam generating heat exchangers employed in the thermodynamic arrangement to compensate the loss of water or other coolant in the form of ejected vapor.

Figure 1:
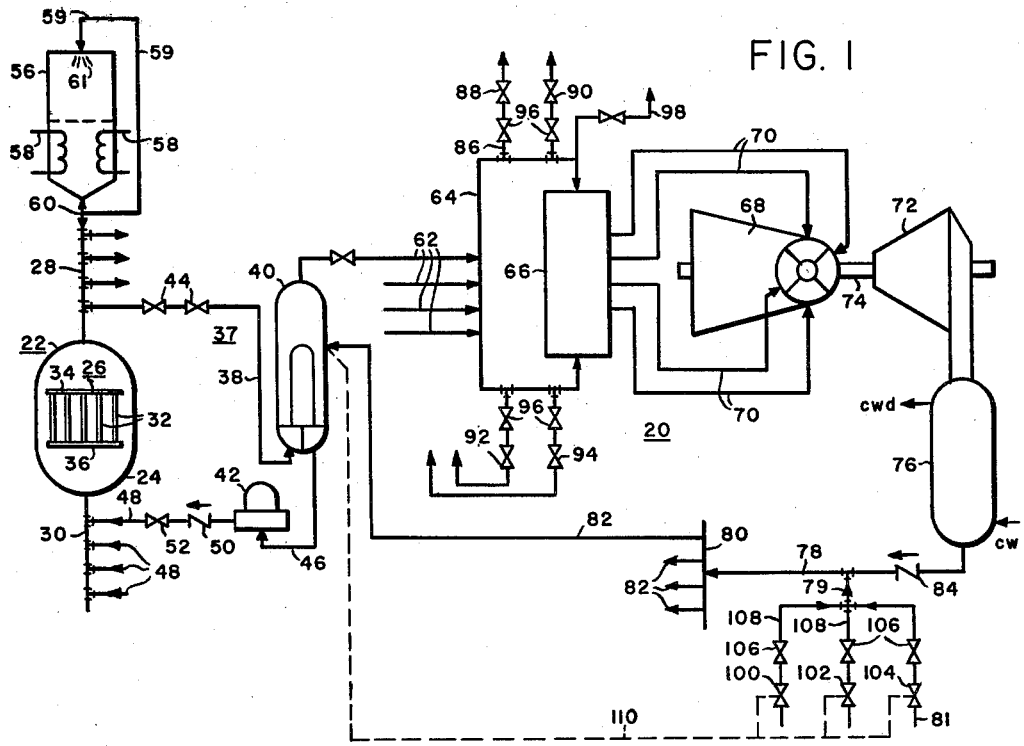
FIGURE 1 is a schematic fluid circuit diagram showing the primary and secondary coolant systems utilized in conjunction with a pressurized water type reactor and illustrating certain components employed in the controlled steam relief system of the invention.

Referring now more particularly to FIGURE 1 of the drawings, an exemplary application of the invention is illustrated therein. In this arrangement, the invention is employed in the secondary coolant system indicated generally by the reference character 20 of a nuclear reactor 22. The reactor 22, for example, is a pressurized water type power reactor such as that described in the aforementioned Geneva Papers, which has a thermal output in the neighborhood of 400 megawatts. The reactor 22 includes a pressurized container or vessel 24 having upper and lower manifolds indicated schematically at 28 and 30, respectively. A reactor core structure 26 is mounted within the vessel 24 by suitable supporting means (not shown) and is comprised of a plurality of fuel element bundles 32. The bundles 32 each consist of a plurality of rods or plates, as the case may be, containing fissile material and spaced to provide flow passages for the reactor coolant. The fuel bundles 32 are supported in generally vertical positions within the reactor core 26 between upper and lower core supporting plates 34 and 36, respectively. Specific details of one form of a pressurized water reactor, including the reactor core and associated equipment, are set forth in the aforementioned Geneva papers.

In this arrangement, the reactor coolant is light water ($H_2O$) which enters the reactor vessel 24 from a plurality of coolant or circulating loops 37 presently to be described and, after flowing upwardly through the reactor core 26, exits from the reactor vessel 24 through the upper manifold 28. At the upper manifold 28 the coolant flow branches into the aforesaid coolant loops by conduits 38. In this arrangement, four coolant or circulating loops 37 are employed with each loop comprising a steam generating heat exchanger 40 and a high volume relatively low head circulating pump 42. The conduits 38 couple the individual heat exchangers 40 to the vessel outlet manifold 28, and each of the conduits contains a pair of stop valves 44 whereby one or more of the circulating loops can be isolated from the primary reactor system. From the steam generator 40 of each loop the primary coolant is conducted to the suction side of the associated circulating pump 42 by means of a connecting conduit 46. The discharge side of each pump 42 is coupled to the lower or input vessel manifold 30 by means of respective conduits 48. Disposed in each conduit 48 is a check valve 50 arranged to prevent reverse flow of coolant from the reactor vessel 24 to the circulating pump 42 in the event of power failure or other contingency and a suitable valve 52 which can be employed in conjunction with valves 44 to isolate a given coolant loop from the primary reactor system.

Coupled to the upper manifold 28 of the reactor vessel 22 is a pressurizing vessel 56. The vessel 56 contains a portion of the coolant liquid, which is vaporized by suitable heaters indicated generally by the reference characters 58. The heaters 58 in this example are provided with sufficient capacity to maintain the operating pressure of the primary reactor system, through vaporization of the coolant liquid contained in the pressurizing vessel 56, in the neighborhood of 2,000 p.s.i. The vapor pressures developed in the pressurizing vessel 56 are imparted to the primary reactor system through a bottom conduit 60 which couples the pressurizing vessel to the primary reactor system.

The pressurizing vessel 56 has sufficient vapor space contained therein to absorb the normal volume changes in the primary coolant, which are caused by fluctuating operating pressures or other system transients, in order to minimize the amplitudes of pressure and volume fluctuations within the primary reactor system. Such pressure and volume changes, of course, are undesirable inasmuch as they effect the reactivity of the nuclear reactor and therefrom render control thereof difficult. During a positive system transient, a portion of the incoming surge liquid is conducted through a conduit 59 to the top or vapor chamber of the pressurizer 56. This surge portion is sprayed into the vapor space as denoted by reference character 61 and condenses a portion of vapor to accommodate additional surge liquid. A suitable form of pressurizer is disclosed and claimed in a copending application of W. J. McShane, entitled, "Pressure Controlling System," filed August 13, 1957, Serial No. 677,875, and assigned to the present assignee.

The effluent steam of each heat exchanger 40 is conducted from the shell side thereof through a valved conduit 62. The conduits 62, in turn, are coupled to an inlet header 64 of a steam chest denoted schematically by the reference character 66. From the steam chest 66 the steam produced in the secondary reactor system 20 is conducted to a high pressure turbine 68 through suitable conduits 70. In this arrangement, a low pressure turbine, indicated generally by the reference character 72 likewise is coupled to turbine shaft 74. Appropriate steam connections (not shown) are made between the high and low pressure turbines 68 and 72 in the conventional manner. Also coupled to the turbine driving shaft 74 in this arrangement is a suitable generator (not shown) having, for example, a maximum capacity of about 100 megawatts.

From the low pressure turbines 72, the spent steam is conducted to a turbine condenser 76, and the condensed output thereof is conveyed through an outlet conduit 78 to a feed water manifold 80. From the manifold 80, the feed water is returned to the steam generators 40 through individual feed water conduits 82. The condenser outlet conduit 78 is provided with a check valve 84 for the purpose of preventing accidental reverse flow of the liquid secondary coolant to the condenser 76 or to the turbines. Make-up feed water, as required by the secondary reactor system 20, is supplied to the outlet conduit 78 by means of a connecting conduit 79 and a valved conduit 81.

In accordance with the invention, the steam chest header 64 is provided with a plurality of controlled relief valves, each coupled in tandem respectively with a like number of manually operable gate valves. Each tandem pair of valves, including a relief valve and a manually operable valve, is connected in a conduit 86 which in turn is coupled to the steam chest header 64. In this example of the invention, four such relief valves 88, 90, 92 and 94 are utilized, and each is associated as aforesaid with a manually operable valve 96. As will be pointed out more clearly hereinafter, the relief valves 88 to 94 are of assorted sizes and are operated automatically, for example, by means of electric circuitry illustrated in FIG. 2 or 3 of the drawings to expel or to dump controlled amounts of steam from the secondary reactor system 20.

The number and sizes of the controlled relief valves 88 to 94, which are operated at a given time, is made to depend upon exceeding predetermined rates of decrease in load demand upon the thermodynamic system being controlled. As indicated heretofore, these decreases, in the case of a nuclear reactor plant, produce corresponding increases in the average temperature of the secondary reactor system. Since less steam is being utilized, these temperature increases in turn can cause dangerously high positive system transients in the primary reactor system due to the fact that less heat is being removed by the steam generators 40. The controlled relief valves 88 to 94 are operated by the circuitry of FIG. 2 only when the rates of load decreases cause pressure increases in the primary system which otherwise would trip the relief valves (not shown) normally associated with the primary reactor system, or other thermodynamic arrangement.

Another reason for operating the controlled relief valve system, only after a given rate of load decrease is exceeded, is based upon the fact that the design characteristics of the primary reactor system are able to compensate the positive transients resulting from lesser load decreases. These lesser rates of load decreases normally are compensated by the positive transient absorbing effect of the surge tank 54 and by the decreased reactivity resulting from attendant temperature increases in the primary coolant. As is well known in a thermal reactor, that is to say one utilizing slow neutrons to propagate the chain reaction, the moderating ability of the material employed to slow the neutrons decreases with increase in temperature such that in this example a negative coefficient of reactivity of about $-2.0 \times 10^{-4} \delta K./°F.$ may be attained. Therefore, in this arrangement, the controlled relief system is arranged to handle only those large and probably unexpected load decreases which otherwise would cause operation of one or more of the various relief valves associated with the reactor plant.

The manually operable valves 96 associated as aforesaid with the controlled relief valves in this example are of the same size and capacity, respectively, as the controlled relief valves 88 to 94. The last-mentioned valves 96 permit isolation of one or more of the relief valves 88 to 94 in the event of malfunctioning of the latter valves. Consequently, the valves 96 normally are open. Another valved conduit 98 is likewise connected to the steam chest header 64 in order to permit ejection of steam from the secondary system 20 during reactor shut-down in order to remove radioactive decay heat from the reactor core 26.

The invention also contemplates the use of one or more feed water valves 100 and 102 which are coupled in bypassing relation to the normal feed water valve 104 of conduit 81. The bypassing valves 100 and 102 are each coupled together with a manually operable valve 106 in one of parallel conduits 108. Each of the bypassing conduits 108 together with the normal feed water conduit 81 is connected to the feed water connecting conduit 79. Each of the valves 106 desirably are the same size as the associated bypassing valves 100 and 102. The bypassing valves 100 and 102 are operated automatically by the electrical circuitry described hereinafter in connection with FIG. 2 of the drawings and are set to open after a predetermined number of the controlled relief valves 88 to 94 have been opened. The purpose of the bypassing feed water valves 100 and 102 is to effect an increase in make-up feed water flow in order to compensate for loss of secondary coolant due to the quantities of steam ejected from the secondary system 20 when one or more of the controlled relief valves 86 to 94 are energized. The manual valves 106 permit isolation of one or more of the feed water valves 100, 102, and 104 in the event of mal-functioning. Each of the feed water valves 100, 102, and 104 in addition is operated automatically by the normal feed water level indicating and controlling circuitry (not shown) associated with the steam generators 40. The latter-mentioned controlling circuitry is of conventional design and is arranged to open and close the feed water valves 100, 102 and 104, as indicated by the operational lines 110. The bypassing feed water valves 100 and 102, however, cannot be opened until a signal is received from the controlling circuit illustrated in FIG. 2 or 3; but on the other hand, a valve closing signal from the normal steam generator controlling circuitry will override a valve opening signal from the controlling circuitry illustrated in FIG. 2 or 3 to prevent overfilling the shell or steam side of the steam generators 40. Useage of the feed water header 80, of course, provides level equalization among the four steam generators 40 utilized in this arrangement.

Figure 2:
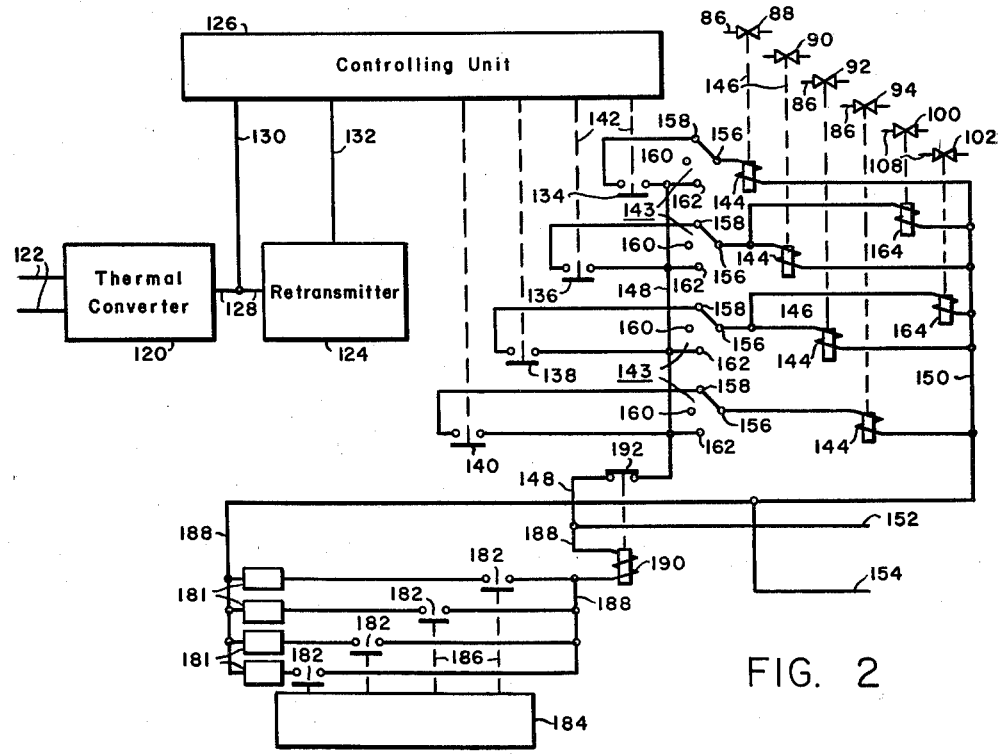
FIG. 2 is a schematic electrical circuit diagram of one form of controlling system for operating the controlled steam relief system in accordance with the present invention; and, FIG. 3 is a schematic circuit diagram of another exemplary form of controlling system, arranged according to the invention, for operating the controlled steam relief system.

Referring now more specifically to FIG. 2 of the drawings, one circuit arrangement for operating the controlled steam relief valves 88 to 94 and the bypassing feed water valves 100 and 102 in accordance with the invention is illustrated therein. The controlling circuitry comprises a standard three-phase thermal converter indicated generally by the reference character 120 which measures gross output power of the aforesaid electrical generator which is associated with the nuclear plant. The thermal converter is a commercially available item of equipment (Leeds and Northrop Catalog No. 10730) and produces a D.C. output linearly proportional to the generator load, which in this arrangement varies from 0 to 100 megawatts.

The converter 120 is coupled to the electrical generator through leads or conductors 122 and a suitable step-down transformer (not shown). The response time for the thermal converting unit 120 is one second; that is to say, the time required for the converter 120 to sense 90% of a change in the aforementioned generator output is equal to one second. The electrical generator output is utilized to provide the input signal of the thermal converter 120 in lieu of a signal related to temperature or pressure in the primary reactor system, described heretofore in connection with FIG. 1, because of the damping effect or delays occasioned in the system, particularly by the steam generators 40, in transferring of a drop in electrical generator output back to the primary system in the form of a positive system transient. In this manner, excessive pressure or volume surges in the primary reactor system can be anticipated and corrected before the effects of drop in generator demand are transferred to the primary reactor system. Therefore, the electrical generator load change magnitude is utilized as the controlled relief system input signal, since the change magnitude is the disturbance that will produce the aforementioned positive system transient when the effect of the load change has been transmitted via the turbine and the steam generators 40 to the primary reactor system.

The output signal of the thermal converter 120 is fed in parallel to a retransmitter or delay network 124 and a mercury switch controlling unit 126, through leads 128 and 130, respectively. The retransmitter 124 is a standard load recorder and retransmitting device available from Leeds and Northrop, Catalog No. 69221. The function of the retransmitter 124 is to retransmit a direct current millivolt signal with a fixed linear time delay. The latter signal, of course, is equivalent to that received by the retransmitter 124 from the converter 120 with the exception of the aforementioned delay. The delayed output signal of the retransmitter 124 is conducted likewise to the controlling unit 126 through a lead 132. The recording feature of the retransmitting device 124 is optional and is not a necessary feature of the invention. This standard retransmitting device employs a retransmitting slide wire arrangement (not shown). The balancing device in this unit is a gear-head, slow-speed motor (not shown) that requires either 12 or 18 minutes for full scale retransmission. The output signal of the retransmitter 124 is equal to the input from the converter 120 when the retransmitting unit is balanced. The aforementioned balancing motor moves the retransmitting slide wire at constant rates equivalent to a demand load change of 8.3 megawatts per minute or 5.5 megawatts per minute. The speed of the balancing mechanism can be changed by replacing the gear head of the aforementioned motor, and the speed or delay time utilized is dependent upon the magnitude of positive system transients that can be tolerated in the primary reactor system. In the arrangement shown, it has been found that useage of the twelve minute retransmission will permit adequate control of this form of thermodynamic system.

The controlling unit 126 likewise is a commercially available device (Leeds and Northrop Catalog No. 69231) and is arranged to sense the difference between the direct signal fed to the relay controller 126 from the converter 120 through conductors 128 and 130 and the delayed signal received from the retransmitter 124. The controlling unit 126 is a servo-type mechanism with an output shaft which is positioned by the unit in accordance with the difference between the input signals supplied to the controlling unit.

In this arrangement of the invention, four mercury switches 134, 136, 138 and 140 are mounted on the aforesaid output shaft (not shown) as indicated by the functional lines 142. The individual positions of the mercury switches are adjustable relative to the shaft such that the switches can be closed and opened by the controlling unit 126 at selected values over the entire range of the relief valve controlling circuitry, which range in this example is 0 to 100 megawatts. By measuring the difference between the two input signals, the controlling unit 126 computes the rate of any fast load change and positions its output shaft accordingly.

In this arrangement, however, the controlling unit is not sensitive to load changes in the positive direction but is operable only when the direct signal from the converter 120 is less, by a predetermined amount, than the delayed signal from the retransmitter 124. As will be explained hereinafter in greater detail, the switches 134 to 140 are opened sequentially when the magnitude of load decreases exceed given rates of change, which in this example are set at increasingly greater magnitudes for the switches 134 to 140, respectively. Before normal load is reestablished relative to the aforesaid electric generator, the switches 134 to 140 are opened automatically by the controlling unit 126 in the reverse order in which they are closed in order to terminate gradually the ejection of steam from the secondary reactor system 20. In this particular arrangement, switch 136 is closed approximately 5.5 minutes after switch 134 is closed; switch 138 is closed about 2.7 minutes after switch 136; and switch 140, 3.6 minutes after switch 138.

The switches 134 to 140 are coupled individually through a three-position manually operable switch 143 to solenoids 144. The solenoids 144 are arranged to open the controlled relief valves 88 to 94, respectively, when the associated switches 134 to 140 are closed. As indicated by the operational lines 146, each solenoid 144 can be arranged to operate its associated valve 88, 90, 92 or 94 either directly or through an intermediate pilot valve (not shown) and suitable pneumatic or hydraulic circuitry.

Each switch 134, 136, 138 or 140 and the associated manually operable switch 143 and solenoid 144 are coupled in parallel series by means of leads 148 and 150 to a pair of electric supply buses 152 and 154, to which is coupled a suitable source of electric potential (not shown). Each manually operable switch 143 is provided for the purpose of permitting an operator to couple selected ones, or all as shown in FIG. 2, of the valve controlling solenoids 144 to the controlling unit 126 when contacts 156 and 158 of the associated switches are coupled. In a similar manner, each of the valves 88 to 94 and their associated solenoids 144 can be isolated from the controlling system by actuating the three-position switches 143 to their open circuit position as indicated by contact 160. In the event of failure in the controlling system or other contingency, each of the controlled steam relief valves 88 to 94 can be coupled manually to the supply circuit represented by buses 152 and 154 by bridging contacts 162 and 156 of the manually operable switches 143. The latter position of the manually operable switches 143, of course, bypasses the associated mercury switches 134, 136, 138 or 140.

In this example, the controlled steam relief valves 88 to 94 are capable accumulatively of ejecting a total of 750,000 pounds of steam per hour at a pressure of 600 pounds per square inch. Ejection of this quantity of steam is adequate to accommodate the primary reactor system after a total load loss of 100 megawatts, although the maximum steam flow in the secondary reactor system, in this example, is of the order of $1.3 \times 10^6$ pounds per hour of steam at 600 p.s.i. The individual capacities of the controlled relief valves 88 to 94 are selected to give approximately four equal pressure surges or positive system transients in the primary reactor system, none of which surges is large enough to reduce the design safety factors required in the primary reactor system or to operate any of the standard safety valves normally associated with the primary system. Additionally, each of the controlled relief valves 88 to 94 are provided with self-actuating trip points which are set at maximum pressures greater than the safety valves normally utilized in the steam or secondary reactor system 20 in order to prevent use of the controlled relief valves in the same manner as the safety valves normally associated with the secondary system. The controlled relief valves 88 to 94 are standard, power-control valves of known design and accordingly a detailed structural description thereof is not deemed necessary.

In this arrangement of the invention, the controlled steam relief valves 88 to 94 may have the following capacities:

| | Steam ejection capacity, pounds per hour |
|---|---|
| Valve 88 | 328,000 |
| Valve 90 | 224,000 |
| Valve 92 | 126,000 |
| Valve 94 | 76,400 |

It should be pointed out that the above capacities or rates of flow of steam are the maximum capacities of the individual relief valves at a secondary system pressure of 600 pounds per square inch. As indicated heretofore, these valves are opened sequentially and accumulatively by the associated relay switches 134 to 140, beginning with the smallest relief valve 94, in order to provide four approximately equal pressure surges of tolerable values in the primary reactor system. However, the relief valves 88 to 94 in this arrangement are provided with widely differing capacities, which increase in accordance with the time sequence at which these valves are opened, due to the fact that the steam pressure in the secondary system decreases, of course, as one or more of the controlled relief valves 88 to 94 are opened. Other reasons for the increasingly larger sizes of these valves are the reduced effectiveness of the negative temperature coefficient of reactivity at lower reactor power levels and the loss of steam generator feed water preheating, which is normally accomplished by steam extracted by bleed lines (not shown) from the steam generators 40.

In this arrangement of the invention the relay switches 134 to 140 are opened and closed as the case may be by the relay controlling unit 126 such that the relief valves 88 to 94 are actuated by the following decreases in demand load, when registered by the controlling unit 126:

| | Opened, megawatts | Closed, megawatts |
|---|---|---|
| Valve 88 | 68 | 66 |
| Valve 90 | 38 | 36 |
| Valve 92 | 23 | 21 |
| Valve 94 | 15 | 3 |

From the foregoing table it will be seen that the valves 88 to 94 will be opened in the order of increasing size as the demand load decreases with valve 94 being opened first. The latter mentioned valve will remain open when the next size valve 92 is opened at a loss of 23 megawatts and so on until all of the valves 88 to 94 have been opened when a 68 megawatt loss in demand load occurs. As indicated heretofore, the valves 88 to 94 are closed sequentially, as aforesaid, in the order of decreasing size by automatic operation of the controlling unit 126. The aforementioned time delays between valve closures are selected to remove in this application sufficient steam from the secondary system to prevent excessive positive transients in the primary reactor system. After the relief valves 88 to 94 have been closed, the normal turbine load can be reestablished.

The foregoing table represents the magnitude of load losses at which the relief valves 88 to 94 can be opened. However, the valves are not opened unless the load loss occurs within a specified time as determined by the delay device 124 and the controlling unit 126. Assuming that the delay device 124 is provided with a twelve-minute gear head, the device then is capable of balancing, by means of its known internal mechanism described briefly heretofore, a signal equivalent to the maximum generator load in twelve minutes. In this arrangement, the maximum load is 100 megawatts and therefore, the delay device is capable of balancing a load decrease at the rate of about 8.3 megawatts per minute or one megawatt in about seven seconds. In the application of the invention, it has been determined that this rate of load decrease can be absorbed by the primary reactor system without operating any of the normal safety valves and without deleteriously affecting reactor criticality. Accordingly, to open the first relief valve 94, a load decrease of about 23.3 megawatts in one minute or sixteen megawatts in about seven seconds is required. However, an instantaneous loss of less than fifteen megawatts will not operate the relief valve 94. In a similar manner, valve 92 will open after a load loss of about 31.3 megawatts in one minute or 24 megawatts in about seven seconds, while an instantaneous loss of less than 23 megawatts will not affect valve 92. The actual rates of load decrease required to operate the remaining relief valves 88 and 90 are obvious from the foregoing paragraphs.

As restoration of the load begins, the controlled relief valves 88 to 94 will be closed respectively at the magnitudes of load loss represented by the valves under the heading "closed" in the preceding table. However, if the load is not thus restored the valves will be closed automatically after predetermined periods of operation, as noted heretofore. The greater differential between the opening and closing points of the smallest valve 94 is necessary to prevent closing of this valve too soon after the preceding valve closure.

While the smallest controlled relief valve 94 is opened, such as occurs with a loss of load of between 15 and 23 megawatts, the normal feed water valve 104 and the associated conduits are of sufficient size to supply not only the normal feed water make-up but also to supply the additional make-up required by the steam lost or ejected from the system through the relief valve 94. As described heretofore, the feed water valve 104 is opened and closed in response to a signal received from conventional feed water level controls associated with the steam generators 40. However, when additional controlled relief valves 88, 90 or 92 are opened, as determined by larger load decrease the normal feed water valve 104 in this arrangement is not of sufficient capacity to maintain the feed water level in each of the steam generators 40 as a result of the increase in steam ejected from the secondary system 20. Accordingly, the additional feed water valves 100 and 102 are coupled to the secondary system 20 in bypassing relation to the normal feed water valve 104 in order to increase the feed water input capacity. The use of two or more feed water valves is desirable, since such valves are less expensive and more easily operated and controlled than a single large valve.

In this form of the invention, the bypassing valves 100 and 102 are operated in a manner similar to the controlled relief valves 88 to 94. A solenoid operating mechanism 164 is provided for each of the bypassing feed water valves 100 and 102 and is coupled into the controlling circuit of FIG. 2 in electrical parallel relation with one of the solenoid actuating mechanisms 144 of the controlled relief valves. In this arrangement, the solenoids 164 are connected in parallel with those solenoids 144 associated with the relief valves 92 and 90, which are the second and third valves to be opened by the controlling unit 126 as the load decreases. In this arrangement then, when only the first relief valve 94 is actuated, additional feed water is supplied as required solely by the normal feed water valve 104, and when the first two valves 94 and 92 are opened by the controlling circuit, feed water is supplied by the normal feed water valve 104 and one bypassing feed water valve 102. On the other hand, when three or all of the controlled relief valves are actuated, both, bypassing feed water valves 100 and 102 together with the normal feed water valve 104 are operable, and at this time their opening and closing are determined by the normal liquid level controlling circuitry associated with the steam generators 40. Thus, it will be seen that each bypassing feed water valve 100 or 102 is operated simultaneously with the controlled relief valve 90 or 92, respectively, since their associated solenoid actuators are coupled in parallel.

Figure 3:
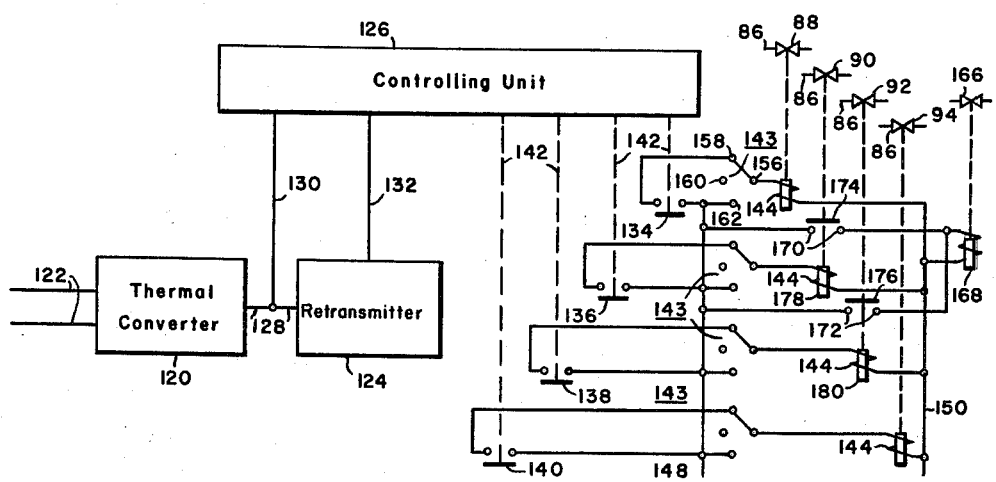

Alternatively, as illustrated in FIG. 3 of the drawings, the pair of bypassing feed water valves 100 and 102 can be replaced by a single larger bypassing feed water valve 166. The last-mentioned feed water valve 166 in this arrangement is opened by energizing a solenoid actuator 168 in a manner similar to that described heretofore in connection with the solenoid actuators 144 and 164. The controlling circuitry of FIG. 3 is arranged to open the bypassing feed water valve 166 when one or more of the controlled relief valves 88 to 94 are opened. As indicated heretofore additional feed water capacity is not needed when the first and smallest relief valve 94 is open and thus the solenoid actuator 168 of the bypassing valve 166 desirably is coupled in parallel with one or more of the remaining relief valves 88 to 92. In the latter arrangement of the invention the solenoid 168 for the feed water valve 166 desirably is coupled in parallel relationship to two of these latter-mentioned relief valves and is arranged such that the feed water valve 166 will be opened when either or both of these relief valves are opened. This arrangement provides a safety factor in the event that one of the larger steam relief valves to which the bypassing feed water valve is coupled in a manner presently to be described fails to operate.

In the latter arrangement of the invention, the solenoid actuator 168 is coupled more or less in parallel relation with each of the solenoids 144 of the relief valves 90 and 92. More specifically, the solenoid actuator 168 is connected across conductors 148 and 150 and thence to the supply buses 152 and 154, in parallel-series with two pairs of switch contacts 170 and 172. Each pair of switch contacts 170 and 172 are arranged for operation by a closure member 174 or 176, respectively. In this arrangement, the closure members 174 and 176 are operated individually by armatures 178 and 180 of the solenoid actuators 144 associated with two of the relief valves 90 and 92. With this arrangement then, it will be apparent that the single bypassing feed water valve 166 will be opened to provide additional feed water capacity when either one or both of the controlled relief valves 90 and 92 are opened.

When used with a nuclear reactor plant the aforedescribed controlled relief system desirably is not operated when other reactor protection systems are energized. The relationship between the steam relief system of the invention and these additional reactor protection systems is shown diagrammatically in FIG. 2 of the drawings. Such other reactor protection systems are arranged, for an example, to cause insertion of the reactor control rods (not shown) to shut down the reactor in the event of loss of primary coolant or other emergency. The control rods are so actuated by suitable drive mechanisms denoted generally by the reference characters 181 and coupled in a series with a plurality of relay switches 182 which in turn are controlled, as shown by operational lines 186, by suitable indicating and controlling circuitry denoted by the reference character 184. The relay switches 182 are coupled in parallel to a pair of conductors 188 which in turn are connected to the supply buses 152 and 154. A coil 190 of a normally closed relay switch 192 is connected in one of the conductors 188 and thus is in series with the parallel switches 182. On the other hand, the relay switch contacts 192 are coupled in the conductor 148 and thus is in series with the relief valve controlling circuitry described heretofore in connection with FIG. 2 of the drawings. In this arrangement, whenever one or more of the relay switches 182 is closed to insert the reactor control rod or to actuate other protected devices associated with the reactor system, the normally closed switch contacts 192 are open by energization of the relay coil 190 to prevent operation of any of the solenoid actuators 144, 164 or 168 (FIG. 3).

From the foregoing description of exemplary embodiments of the invention, it will be seen that a novel and efficient controlled relief system has been disclosed herein. Although described primarily with a nuclear reactor plant, it will be obvious that the controlled relief system of the invention can be adapted with equal facility to any conventional steam generating plant or system wherein the pressure of the steam generating portion of the system need not be maintained constant and wherein it is desirable to eject steam from the system in varying quantities in order to control the system. As an example, the invention can be adapted for use with a mercury-water steam generating system employing a conventional heat source, wherein the controlled ejection of steam from the secondary or water system is desirable to prevent excessive positive system transients in the primary or mercury system. Moreover, it will be obvious that the particular rates of load change and valve opening and closing sequences are set forth herein merely by way of example and that other rates and sequences can be employed depending upon the characteristics of the thermodynamic system being controlled. Furthermore, it will be apparent that the particular items of commercially available equipment, for example the converter 120, the delay device 124, and the controlling unit 126 can be replaced by other devices having the similar overall functions of computing the rates of load changes and operating the solenoids 144 in response to predetermined characteristics of these load changes. Therefore, it is to be understood that the descriptive material and drawings are presented herein for purposes of illustrating and describing the invention and should not be interpreted as limitative thereof.

Therefore, numerous embodiments of the invention will occur to those skilled in the art without departing from the spirit and scope of the invention. Moreover, it will be understood that certain features of the invention can be utilized without a corresponding use of other features thereof.

Accordingly, what is claimed as new is:

1. In a steam generating system coupled to a varying load device, the combination comprising a plurality of relief valves coupled to the output of said system for ejecting quantities of steam from the system in bypassing relation to said load device actuating said valves sequentially to eject controlled amounts of steam from said system, and means coupled to said last-mentioned means for energizing said actuating means in response to changes in said load device.

2. In a steam generating system coupled to a varying load device, the combination comprising a plurality of relief valves coupled to the output of said system for ejecting quantities of steam from the system in bypassing relation to said load device, means for actuating said valves sequentially to eject controlled amounts of steam from said system, means coupled to said actuating means for energizing said actuating means in response to changes in said load device, a make-up feed water conduit coupled to the input of said system, valve means coupled in said conduit, means for opening and closing said valve means, and means coupled to said valve actuating means for energizing said valve opening and closing means when selected ones of said relief valves are opened.

3. In a steam generating system coupled to a varying load device, the combination comprising a plurality of relief valves coupled to the output of said system for ejecting quantities of steam from the system in bypassing relation to said load device, said valves being of varying flow capacities, means for actuating said valves sequentially to eject controlled amounts of steam from said system, and means coupled to said actuating means and to the output of said load device for energizing said actuating means in response to predetermined load changes in said generating system, said actuating means being energized to open said valves in the order of their increasing capacities.

4. In a steam generating system coupled to a varying load device, the combination comprising a plurality of relief valves coupled to the output of said system for ejecting quantities of steam from the system in bypassing relation to said load device, means for actuating said valves sequentially to eject controlled amounts of steam from said system, means coupled to said actuating means for energizing said actuating means in response to changes in the output of said load device, make-up feed-water conduits coupled generally in parallel to the input of said steam generating system, a feed-water valve connected in each conduit, means for opening and closing said feed-water valves, and means coupled to said last-mentioned means and said energizing means for opening at least one of said feed-water valves when selected ones of said relief valves are opened.

5. In a steam generating system coupled to a varying load device, the combination comprising a plurality of relief valves coupled to the output of said system for ejecting quantities of steam from the system in bypassing relation to said load device, means for actuating said valves sequentially to eject controlled amounts of steam from said system, means coupled to said actuating means for energizing said actuating means in response to changes in the output of said load device, a plurality of feed-water conduits coupled generally in parallel to the input of said steam generating system, a feed-water valve connected in each of said conduits, means for opening and closing said feed-water valves, and means coupled to said last-mentioned means and to said energizing means for sequentially opening said feed-water valves substantially in the order that said relief valves are actuated.

6. In a controlled relief system for steam utilizing machinery and the like, the combination comprising circuit means for converting the varying output of said machinery into an electrical signal, a delay network coupled to the output of said circuit means, controlling means coupled to the outputs of said circuit means and of said delay network, said controlling means being arranged to close sequentially a plurality of switching means in response to differences between the original and delayed signals received by said controlling means from said circuit means and said delay network respectively, a valve actuating mechanism coupled in series with each of said switching means and with a source of electric potential, and a plurality of relief valves connected respectively to said actuating mechanisms.

7. A power system comprising steam generating means, a conduit for conveying steam produced by said steam generating means to a variable load device, means coupled to said conduit in bypassing relation to said load device and actuatable to relieve steam pressure in said system, and means coupled to the output of said load device and responsive to a predetermined change in load therein within a predetermined time for actuating said pressure relieving means.

8. A power system comprising steam generating means, a conduit for conveying steam produced by said steam generating means to a variable load device, ejecting means coupled to said conduit in bypassing relation to said load device and actuatable to eject differing amounts of steam from said system, and control means coupled to the output of said load device for actuating said ejecting means, said control means being responsive to differing predetermined rates of change in said output for actuating said ejecting means to eject an amount of steam proportional to said rates of change.

9. In a steam generating system coupled to a varying load device, the combination comprising a plurality of relief valves coupled to the output of said system for ejecting quantities of steam from the system in bypassing relation to said load device, means for actuating said valves sequentially to eject controlled amounts of steam from said system, means coupled to said actuating means for energizing said actuating means in response to changes in the output of said load device, and means for supplying make-up feed-water to the input of said system in proportion to the number of said relief valves actuated to the open position thereof.

10. In a steam producing system containing steam generating means, the combination comprising a conduit for conveying steam to a variable load device, a plurality of relief means coupled to said system in bypassing relationship to said load device for ejecting differing amounts of steam from said system, control means coupled to the output of said load device for actuating said relief means, said control means being responsive to differing predetermined rates of change in said output for actuating said relief means to eject an amount of steam proportional to said rates of change, said control means including circuit means for converting the output of said load means into an electrical signal, a delay network coupled to the output of said circuit means, comparing means having its inputs coupled to the outputs of said circuit means and of said delay network, said comparing means being arranged to close sequentially a plurality of switching means in response to differences in its input signals, said switching means being coupled respectively to actuate said relief means to eject excess steam from said system.

11. In a steam producing system containing steam generating means, the combination comprising a conduit for conveying steam to a variable load device, a plurality of relief means coupled to said system in bypassing relationship to said load device for ejecting differing amounts of steam from said system, control means coupled to the output of said load device for actuating said relief means, said control means including circuit means for converting the output of said load means into an electrical signal, a delay network coupled to the output of said circuit means, comparing means having its inputs coupled to the outputs of said circuit means and of said delay network, said comparing means being arranged to close sequentially a plurality of switching means in response toi differences in its input signals, said switching means being coupled respectively to actuate said relief means to eject excess steam from said system.

12. In a steam generating system coupled to a varying load device, the combination comprising a plurality of relief valves coupled to the output of said system for ejecting quantities of steam from the system in bypassing relation to said load device, actuating means for actuating said valves sequentially to eject controlled amounts of steam from said system, control means coupled to the output of said load device for providing a control signal to said actuating means for actuating said relief valves, said control means being responsive to different predetermined rates of change in said output for actuating said actuating means to cause said relief valves to eject an amount of steam proportional to said rates of change, said control means including circuit means for converting the output of said load means into an electrical signal, a delay network coupled to the output of said circuit means, comparing means having its inputs coupled to the outputs of said circuit means and of said delay network, said comparing means being arranged to close sequentially a plurality of switching means in response to differences in its input signals, said switching means being coupled respectively to said actuating means for said relief valves to eject excess steam from said system, a make-up feed water conduit coupled to the input of said system, valve means coupled in said conduit, means for opening and closing said valve means, and means coupled to said valve actuating means for energizing said valve oepning and closing means when selected ones of said relief valves are opened.

References Cited in the file of this patent

UNITED STATES PATENTS

| | | |
|---|---|---|
| 2,088,623 | Thompson | Aug. 3, 1937 |
| 2,596,968 | Harris et al. | May 20, 1952 |
| 2,643,520 | Powell | June 30, 1953 |
| 2,672,732 | Smith et al. | Mar. 23, 1954 |
| 2,668,915 | Dickey | Feb. 9, 1954 |
| 2,681,418 | Bristol | June 15, 1954 |
| 2,734,529 | Harrison | Feb. 14, 1956 |
| 2,741,266 | Grayson | Apr. 10, 1956 |

FOREIGN PATENTS

| | | |
|---|---|---|
| 770,231 | Great Britain | Mar. 20, 1957 |
| 774,222 | Great Britain | May 8, 1957 |

OTHER REFERENCES

Progress Report on Dresden Station (Paper presented at a joint session of the Nuclear Engineering and Power Divisions at the ASME Annual Meeting, New York, Nov. 26, 1956); 25 pages, see pages 4, 7, 17, 18.

Proceedings of the International Conference on the Peaceful Uses of Atomic Energy, Aug. 8–20, 1955, vol. 3, pages 257–259, published by United Nations, New York.

Nucleonics, vol. 11 (June 1953), pages 51–55.

Parsegian, Institute of Radio Engineers, 1956, National Convention, New York, Mar. 19–22, 1956.